INVENTORS
HOWARD P. ANDREASEN,
JAY H. ANKENY,
HAROLD W. FODDY &
DAVID W. REYNOLDS
BY
Molinare, Allegretti, Newitt &
Witcoff       ATTORNEYS

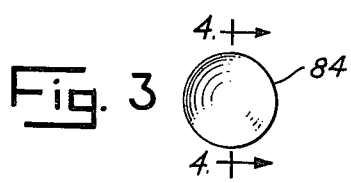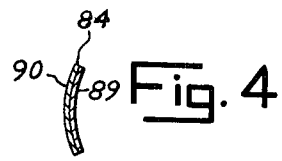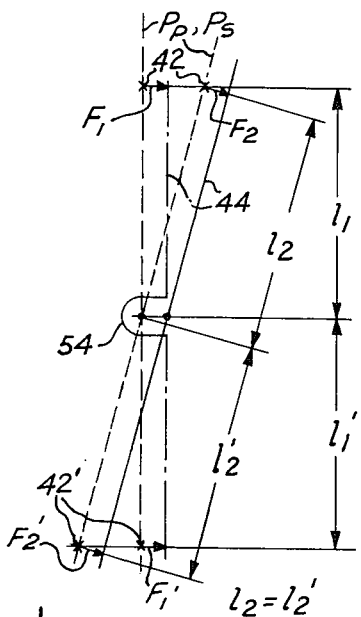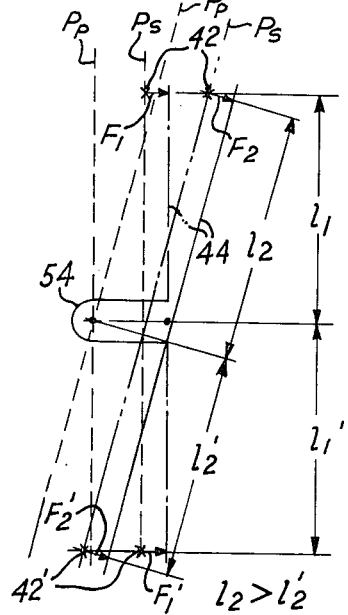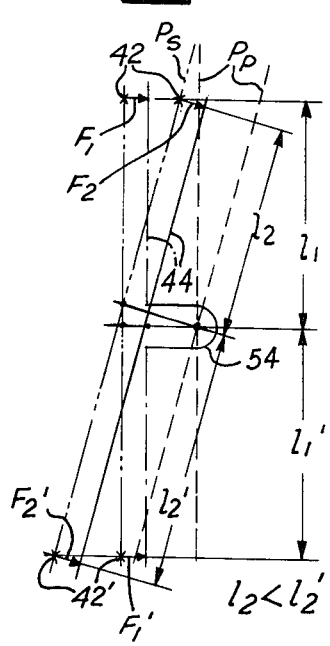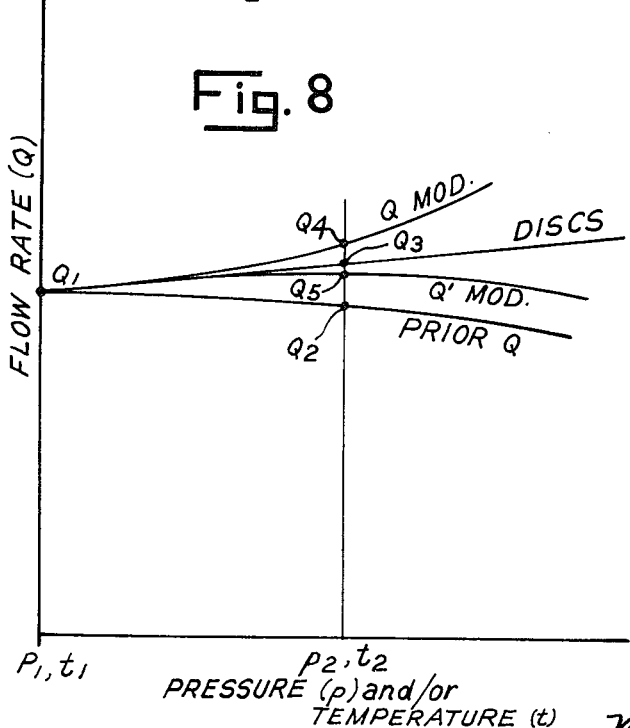

United States Patent Office 3,676,020
Patented July 11, 1972

---

3,676,020
COMPENSATED HYDRAULIC DEVICE

Howard P. Andreasen and Jay H. Ankeny, West Des Moines, Harold W. Foddy, Woodward, and David W. Reynolds, West Des Moines, Iowa, assignors to Delavan Manufacturing Co.
Filed Feb. 24, 1970, Ser. No. 13,722
Int. Cl. F04b 1/26
U.S. Cl. 417—222                                    16 Claims

---

ABSTRACT OF THE DISCLOSURE

An axial piston hydraulic device having an angularly tiltable cam plate includes a pair of tilt control piston assemblies, one of which includes a plurality of resilient, preferably bimetal, discs. When the pressure or temperature of the fluid changes, the discs deform in response thereto to effect a controlled change in the tilt of the cam plate to adjust the flow rate of the device compensating for flow rate changes resulting from the change in pressure or temperature. In addition, the plane of the pivot axes of the pistons of the device may be offset from the pivot axis of the cam plate to further modify the flow rate resulting from the action of the discs.

---

BACKGROUND AND SUMMARY OF THE INVENTION

This invention relates to a fluid pressure device and, more particularly, to a hydraulic device in which the flow rate of the working fluid may be automatically compensated for flow rate changes which result from changes in pressure and temperature of the fluid.

In the past, hydraulic pump and motor devices have been generally unsuitable for use in applications where a substantially constant speed system output is of prime importance and where such hydraulic systems are subjected to wide variations of load and/or temperature. When the pressure or temperature of the system increases due to these variations, the flow rate of the fluid will generally drop off due to internal leakage in these devices. An increase in the line pressure will result in increased leakage about the numerous parts of pump or motor devices which are exposed to the increased pressure, for example the cylinders, the pistons and the like. Also, an increase in temperature of the fluid, either as a result of the imposition of a substantial load on the system or a change in the ambient temperature of the environment, not only decreases the viscosity of the hydraulic fluid which results in increased leakage, but also increases the spacing distance between the component parts of the device due to expansion of these various parts.

The fluid pressure device constructed in accordance with the principles of our invention readily and automatically compensates for changes in flow rate which result from pressure and/or temperature changes. The device of our invention will automatically compensate for flow rate losses which result from pressure or temperature increases in the fluid and is capable of maintaining the fluid flow rate at either a substantially constant or at an increased flow rate over a wide range of pressure and temperature variations. Moreover, in the device constructed in accordance with the principles of our invention, the flow rate may not only be automatically adjusted so as to actually increase upon an increase of pressure or temperature, but may be further compensated to remain substantially constant, to increase or decrease over a wide range of pressure and temperature changes. In the device of our invention, the tilt on the piston controlling cam plate may be selectively and automatically varied in response to pressure and/or temperature changes to maintain or increase the flow rate of the fluid.

The fluid pressure device incorporating the principles of our invention includes at least one piston reciprocal within a cylinder and inlet and discharge means for introducing fluid to and discharging fluid from the cylinder. A cam surface mecahnically coacts with the piston to reciprocate the piston for cyclically varying the volume of the cylinder. A fluid flow varying means changes the flow rate of the fluid through the device to a predetermined flow rate from a first predetermined flow rate at a first given pressure and temperature of fluid, the first mentioned predetermined flow rate differing from a second predetermined flow rate, the latter flow rate being that flow rate which obtains when at least one of the pressure and temperature is greater than the first given pressure and temperature. The fluid flow varying means changes the flow rate in response to an increase from at least one of the first to the second given pressures and temperatures of the fluid.

In the preferred embodiment of our invention, a plurality of concave resilient bimetallic discs are responsive to pressure and temperature changes to vary the tilt of the cam plate.

In addition, compensating means may be provided for further changing the flow rate of the device to still another predetermined flow rate which differs from the above mentioned flow rates.

This latter compensating means preferably takes the form of spacing the rotative plane of the piston shoes from that of the cam plate.

These and other objects, features and advantages of the present invention will be more clearly understood from a consideration of the following detailed description.

BRIEF DESCRIPTION OF THE DRAWINGS

In the course of this description, reference will frequently be made to the attached drawings in which:

FIG. 3 is a plan view of a compensating disc of our invention;

FIG. 4 is a cross sectioned elevation view of the disc taken along line 4—4 of FIG. 3;

FIGS. 5, 6 and 7 are schematic presentations of the cam plate and cam plate piston shoes of the pump of our invention in which the pivot axis of the cam plate coincides with, is displaced to the left of, and is displaced to the right, respectively, of the plane of the pivot axes of the piston shoes; and FIG. 8 is a representative graph plot of fluid flow rate (Q) vs. pressure (p) and/or temperature (t) of the fluid.

DESCRIPTION OF THE PREFERRED EMBODIMENTS

Figure 1:
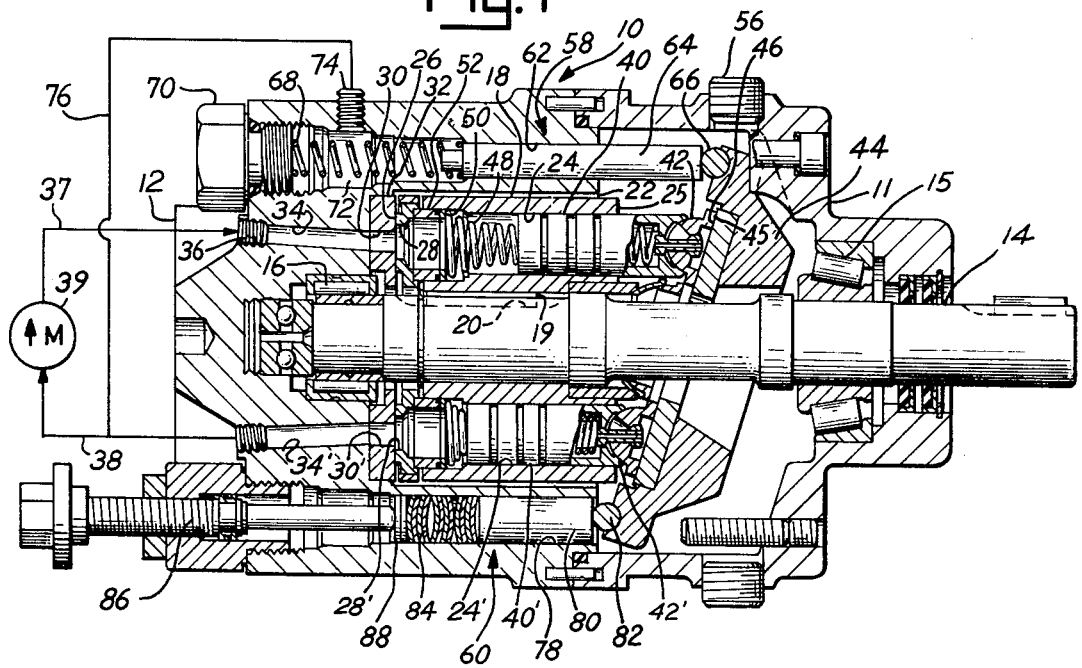
FIG. 1 is a cross sectional side elevation view of an axial piston hydraulic pump constructed in accordance with the principles of our invention, the passages through the left end plate of the pump having been rotated 90° for the purpose of clarity.
Figure 2:
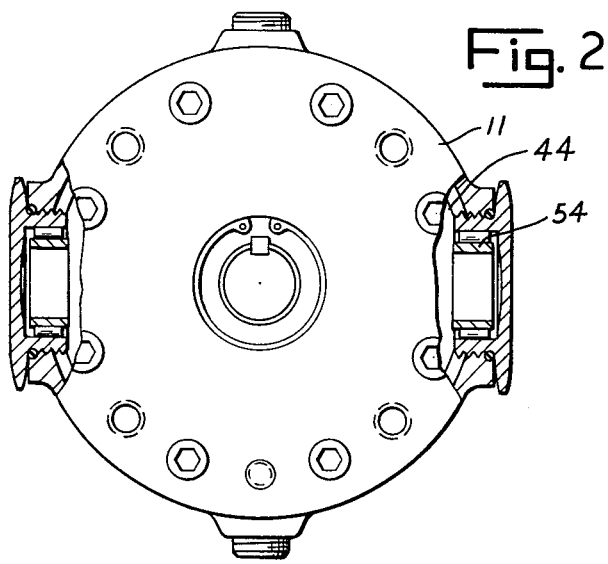
FIG. 2 is an end elevation view of the pump as viewed from the right in FIG. 1, and having portions thereof broken away to show the cam plate trunnion bearings.

Referring to FIGS. 1 and 2, an axial piston hydraulic pump is shown which includes a housing 10 closed at both ends 11 and 12. A drive shaft 14 extends through one end 11 of the housing and is mounted for rotation in the housing by suitable bearings 15 and 16. A generally cylindrical rotor 18 is carried on the drive shaft 14 and is keyed for rotation by the drive shaft by a key 19 and slot 20. The periphery of the rotor 18 is spaced slightly at 22 from the inner wall of the housing so that the rotor will not contact the latter during rotation.

A plurality of cylinders, e.g. 24 and 24', extend through the rotor 18 and open to the opposite end faces 25 and 26 thereof, each of the cylinders being substantially parallel to each other and spaced radially from and parallel to the drive shaft 14. A plurality of cylinder ports 28 open through the end of each of the cylinders and the rotor end face 26 and each of the cylinder ports 28 communicates with one or the other of arcuate ports 30 or 30' in a valve plate 32 which bears against the rotor face 26. The valve plate 32 is fixed to the housing end cover 12 and is stationary during operation. One of the arcuate ports 30 is a suction port and the other port 30' is a discharge port, each of the ports communicating with the cylinder ports 28 and 28' such that the suction port 30 is in communication with a given cylinder port over approximately 180° rotation of the rotor so as to introduce hydraulic fluid through a passage 34 through the housing end 12 into the cylinder 24 and the other port 30' is in communication with the given cylinder port over the other approximately 180° of rotor rotation so as to receive fluid discharged from the cylinder and transmit the high pressure discharged fluid through passage 34' in the housing end. Each of the passages 34 and 34' may be suitable adapted, as by threads 36 for connection to suction and discharge conduits 37 and 38 respectively, and hydraulic motor 39.

A plurality of pistons 40 and 40' are fitted for reciprocation in each of the cylinders. Each piston includes a cam plate pivot shoe 42, 42' adjacent its distal end. The pivot shoes 42, 42' extend beyond the end face 25 of the rotor and are engaged or associated in a conventional manner to a tiltable cam plate 44 such that a planar end surface 45 of each shoe is slideable against a cam surface 46 of the cam plate as the rotor 18 rotates. Each of the pistons 40, 40' is urged toward the cam surface 46 by a spring 48 positioned in each cylinder, the spring acting against the inner end of its piston and a shoulder 50 adjacent the sleeve 52 which communicates with the cylinder ports 28.

The cam plate 44 is mounted for tiltable angular adjustment relative to the end face 25 of the rotor about an axis provided by trunnion bearings 54, shown in FIG. 2. The means by which the angular disposition of the cam plate is varied, will be described later. It may be generally stated, however, that the variation of the angular disposition of the cam plate is operative to vary the pump flow rate in a well known manner.

Thus far the pump which has been described is of the conventional form, and, likewise, its operation thus far is conventional. Briefly, the drive shaft 14 and rotor 18 are rotated. Since the spring 48 urges the pistons 40 toward the cam surface 46 of the non-rotating cam plate 44, the upper piston 40 as shown in FIG. 1, will move to the right, creating a suction in the upper cylinder 24. Hydraulic fluid is hereby drawn through passage 34, valve plate port 30, and the cylinder port 28 to fill the upper cylinder 24. As the rotor 18 continues to rotate to a position in which the previously filled cylinder 24 is at the bottom, as shown in FIG. 1 at 24', the piston 40' will be urged against spring pressure into the cylinder 24', by the cam surface 46 of the cam plate, to discharge its fluid under high pressure through cylinder port 28', discharge port 30' in the valve plate, and passage 34'.

If the line pressure obtaining in passage 34' is substantially increased, for example, due to a substantial increase in the load on motor 39, the leakage to the housing between various component parts of the pump which are movable relative to each other and which are exposed to the fluid will increase. Likewise, if the temperature of the hydraulic fluid is substantially increased, leakage will also increase due both to the decrease in viscosity of the fluid as well as the increase in the clearance between the parts due to expansion. At elevated temperatures or pressures such leakages for example, will increase between the pistons 40 and 40' and their cylinders 24 and 24' and between the rotor face 26 and the valve plate 32.

The leaked fluid will collect in the housing and drain to the fluid reservoir. The housing is preferably maintained full of the leaked fluid and at substantially atmospheric pressure, the excess fluid in the housing draining through fittings 56 back to the hydraulic fluid reservoir (not shown).

If this leakage would be constant over wide temperature or pressure variations, the pump would deliver at a substantially constant flow rate and thereby no speed variation would be experienced in the ultimate assembly driven by motor 39. However, due to the very nature and construction of such axial hydraulic piston devices, this leakage variation cannot be entirely eliminated. Thus the flow rate of the hydraulic fluid generally decreases as the pressure or temperature of the system increases. Such decrease in flow rate is depicted in FIG. 8 by the curve marked "PRIOR Q." It will be seen that without compensation of the flow rate for these pressure or temperature variations, the discharge flow rate $Q_1$, will substantially decreases as either the pressure $p_1$, increases to $p_2$ or the temperature $t_1$, increases to $t_2$. The amount of decrease in the flow rate Q is frequently such that the hydraulic device is no longer suitable for use in applications where constant speed is important.

In accordance with the principles of our invention, pressure-temperature compensating means are provided which are capable of maintaining the flow rate Q either substantially constant over wide pressure and/or temperature variations or, if desired, may be capable of actually automatically increasing the flow rate when the pressure and/or temperature increases.

Referring again to FIG. 1, the pressure-temperature compensating means comprises a pair of piston assemblies 58 and 60 in the housing 10, each of the piston assemblies being operatively associated with the cam plate so as to control the angular disposition or tilt of the latter.

The first of the piston assemblies 58 includes a multi-stepped cylinder 62 and a slideable piston 64 is positioned in the cylinder and extends into contact with the cam plate periphery at a point 66 spaced from the tilting axis of the cam plate 44. This piston 64 is urged toward the cam plate by a resilient spring 68 which bears against the other end of the piston and a plug 70 which is threaded into the outer end of the cylinder 62 to close the cylinder to provide a pressure chamber 72 therein. A fitting 74 communicates the chamber 72 with a conduit 76 which transmits discharge pressure fluid to the chamber thereby maintaining the chamber 72 at discharge pressure during operation.

The other piston assembly 60 also comprises a cylinder 78 in the housing. A piston 80 is positioned in cylinder 78 and bears against the periphery of the cam plate 44 at a point 82 which is spaced from the pivot axis of the cam plate, but opposite point 66. A plurality of concave discs 84 are positioned in the cylinder 78 between the other end of the piston and the tip of a threaded adjustment screw 86. One or more spacing discs 88 may be included between discs 84 and the screw 86.

These discs 84 are formed of a resilient material and preferably one or more of the discs 84 comprise two lamination layers 89 and 90 of different metals having different thermal coefficients of expansion, as shown in FIG. 4. Such bimetal laminated construction renders the discs 84 responsive to temperature changes whereby the degree of concavity of the discs will change depending upon their temperature. One or more of these discs 84, depending upon the pressure and/or temperature response desired, are positioned in the cylinder 78 and the adjustable screw 86 is screwed into the housing until the discs 84 are firmly held between the piston 80 and the screw. If more than one of the concave discs are employed, the concave faces of adjacent discs are preferably reversed.

The discs 84 preferably freely communicate with the fluid in housing 10 so that they are maintained at all times at substantially the operating temperature of the fluid. It will be appreciated that a fitting and pressure reducing device may be employed as necessary, to port a small flow of discharge fluid to the discs to render them responsive to the fluid temperature, if the former arrangement is not satisfactory.

In operation, when the pump is started, hydraulic fluid fills the rotor cylinders 24 through passage 34 and is discharged under pressure from the rotor cylinders 24′ through passage 34′ to the discharge conduit 38 and motor 39. Referring to FIG. 8 it will be assumed that this discharge fluid is at a pressure $p_1$ and a temperature $t_1$.

Fluid at $p_1$ will pressurize the chamber 72, by way of conduit 76 and fitting 74, and continuously urge piston 64 toward the cam plate 44, exerting a force on the cam plate so as to tend to tilt the cam plate and its cam surface 46 in a clockwise direction as viewed in FIG. 1. Tilt of the cam plate in that direction will progressively compress the discs 84 until the tilt is limited by an equal and opposite couple which is exerted by the compressed discs 84 through piston 80 at point 82.

The degree of tilt of the cam plate, and hence the flow rate $Q_1$ of the pump at pressure $p_1$ and temperature $t_1$ may be initially adjusted by varying the degree of compression on the concave discs 84 by adjusting the screw 86.

Now let it be assumed that the pressure is increased in the discharge passage 34′ to, for example, $p_2$ as shown in FIG. 8. Such pressure increase may be the result of a sudden load being placed on motor 39. In the prior pumps, with such pressure increase the flow rate would tend to decrease to $Q_2$ along curve "PRIOR Q" shown in FIG. 8. In the compensated hydraulic device above described, however, this increased pressure $p_2$ is communicated, by way of conduit 76 and fitting 74, to the pressure chamber 72, exerting a greater force on piston 64 so as to rotate the cam plate 44 further in the clockwise direction as viewed in FIG. 1 and increase the stroke of the pistons 40. This clockwise rotation is limited by the spring force exerted by the now further compressed resilient discs 84 through piston 80. Thereby the cam plate 44 is only rotated a small amount sufficient to increase the flow rate from $Q_2$ to $Q_3$. The cam plate rotation is thus a function of the resistance presented to rotation in the loss of concavity of the discs 84 and rotation ceases when the couple exerted by piston 64 is balanced by the opposite couple provided by the discs 84.

If it is now assumed that the temperature of the fluid, rather than the pressure, increases from a temperature $t_1$ to $t_2$, the flow rate of the pump will again tend to drop off to, for example, $Q_2$. However, since the discs 84 are bimetallic, they will tend to lose a certain degree of their concavity upon the increase of the temperature of the fluid, the discs being exposed to the system fluid temperature as previously described. Since the discs 84 become less concave, their piston 80 offers less resistance to the clockwise rotation of the cam plate 44 allowing the piston 64 to act upon the cam plate to slightly rotate the plate, increasing the stroke of the pistons 40 and thereby increasing the flow rate to $Q_3$ as indicated in FIG. 8.

If either the temperature or pressure decrease, operation of pistons 64 and 80 will simply be reversed, piston 80 acting to tilt the cam plate in the opposite counter-clockwise direction as viewed in FIG. 1 and piston 64 limiting such offstroke tilt.

It will be understood that, although single curves and points have been employed in FIG. 8 to describe the operation with respect to both temperature and pressure, in fact, the curves and points with respect to the individual effects of each of the latter would probably vary somewhat from each other in reality, the use of single curves and points having been employed solely for purposes of illustration clarity. It will also be understood that, although the operation of the compensating means has been described in terms of its operation with respect to pressure and temperature variations individually, the compensating means is readily operable when both the pressure and temperature vary simultaneously. It will also be understood that if temperature compensation is not desired, discs 84 need not be bimetallic.

The number and/or composition of the discs 84 may vary according to the magnitude of resistance to cam plate rotation, and hence pressure-temperature compensation, desired. The selection of materials or numbers of discs, as well as their formation and arrangement, is well within the skill of one skilled in the art after he has considered the principles of our invention. The resistance to cam plate rotation afforded by the discs may be selected so as to maintain the flow rate substantially constant, somewhat less than constant, or substantially greater than constant over a wide range of temperature and/or pressure increases as desired.

In addition to the flow rate compensation afforded by the discs 84, the flow rate may be further modified or compensated by varying the relationship between the pivot axis of the cam plate 44 and the plane of the pivot axis of the respective piston shoes 42, 42′. Such modified flow rates are represented in FIG. 8 by the curves identified as "Q MOD." and "Q′ MOD."

Referring to FIGS. 5–7, the cam plate is shown in both a dot and dash "no stroke" position and a solid tilted position. The cam plate pivoting arrangement is also shown schematically including the trunnion bearing 54 which provides the pivot axis of the cam plate, and which is carried by the cam plate 44 substantially midway between the individual piston ball socket shoes 42, 42′ which bear against the cam surface of the cam plate in spaced relationship to each other adjacent the periphery of the cam plate. In FIGS. 5–7, the plane which passes through the several pivot axes of the piston shoes 42, 42′ is denoted $P_s$ and the plane which passes through the trunnion bearing of the cam plate pivot axis is denoted $P_p$.

In FIGS. 5–7, when the cam plate is in its vertical "no stroke" position, the pistons 40, 40′ will exert a force $F_1$ and $F_1'$ respectively, on the plate which tend to rotate the plate in one direction or the other by exerting a couple about axis 64 of the plate over moment arms $1_1$ and $1_1'$ between the pivot axis 54 and the shoes 42 and 42′ respectively. In each of FIGS. 5–7, when the plate is in the dot and dash "no stroke" position, $1_1$ equals $1_1'$.

Still referring to FIGS. 5–7, $F_1$ substantially equals $F_1'$ and $F_2$ substantially equals $F_2'$. However, since the forces $F_2$ and $F_2'$ act through the pivot axes of the piston shoes 42, 42′ and are the components of the axial forces $F_1$ and $F_1'$ which are normal to the tilted cam surface of the cam plate 44, the former forces will be somewhat greater than the latter forces.

It will be seen from FIG. 5, that if $P_s$ and $P_p$ are coincident, i.e. lie in the same plane, that the tendency of the cam plate to be rotated in one direction or the other under the influence of the forces $F_2$ and $F_2'$ exerted by the pistons 40, 40′ will remain substantially unchanged when the plate is tilted since the moment arms or distances $1_2$ and $1_2'$ will remain equal to each other. Thereby, where each of the axes lie in the same plane as shown in FIG. 5, the compensating effect will principally be that resulting from the action of the discs 84 as shown in FIG. 8 by the curve identified "DISCS."

However, if the cam plate trunnion bearing 54 is still mounted midway between the shoes 42, 42′ but in further spaced relationship from the cam plate on the same side of the plate as the pistons so that the plane $P_p$ is spaced from the plane $P_s$ as shown in FIG. 6, the distance $1_2$ between the cam plate pivot axis and the force $F_2$ will become greater and the distance $1_2'$ between the pivot axis of the cam plate and the force $F_2'$ will become shorter on tilt of the plate. Thus, the couple is reduced which results from the force $F_2'$ exerted by pistons 40′ at the bottom of the cam plate and which tended to rotate the cam plate in the counterclockwise direction to decrease the flow rate, and the couple which tends to increase the tilt resulting from force $F_2$ over moment arm $l_2$ is increased. Thereby, for a given pressure and/or temperature increase, the degree of increase in the tilt of the cam plate will be greater and accordingly the change in flow rate will be greater than that experienced by the action of the discs alone. The performance curve of this modified or compensated flow rate is shown in FIG. 8 as the upper curve marked "Q MOD.", the flow rate at $p_2$ $t_2$ being $Q_4$.

Conversely, if it is desired that the flow rate increase by a lesser amount than that afforded by the compensation of the discs 84 alone, the trunnion bearing 54 may be mounted midway between the shoes, but to the opposite side of the cam plate 44 as shown in FIG. 7. When the trunnion bearing 54 is so mounted, the plane $P_p$ passing through the pivot axis of the cam plate is again spaced from the plane of the pivot axes of the piston shoes $P_s$, but in the opposite direction as that shown in FIG. 6. Accordingly, when the cam plate 44 is tilted, the distance $l_2$ between the pivot axis of the cam plate and force $F_2$ will become less than the distance $l_2'$ between the pivot axis of the cam plate and the force $F_2'$. Thereby, for a given pressure or temperature increase, the change in flow rate will be less than that afforded by the action of the discs alone. The performance curve of this modified flow rate is shown in the lower curve in FIG. 8 identified as "Q'MOD.", the flow rate at $p_2$, $t_2$ being $Q_5$.

It will be understood that even though the hydraulic device of our invention has been described in terms of a hydraulic pump, the principles of our invention may be employed with equal facility in a device which acts as a motor. In addition, it will be understood that the principles of our invention may be incorporated in pumps other than the axial piston variety. It should also be understood that the embodiments of the invention which have been described are merely illustrative of a few of the applications of the principles of the invention. Numerous modifications may be made by those skilled in the art without departing from the true spirit and scope of the invention.

What is claimed is:

1. A fluid pressure device including:
   at least one piston positioned for reciprocation in a cylinder,
   inlet and discharge means for introducing fluid to said cylinder and discharging fluid from said cylinder as said piston reciprocates,
   cam means having a cam surface mechanically coacting with said piston for reciprocating said piston to cyclically vary the volume of said cylinder when one of said piston and cam surface is rotated relative to the other,
   a given cyclic variation of said volume providing a first predetermined flow rate through said inlet and discharge means at a first given pressure and temperature of said fluid and a second predetermined flow rate at at least one of the second given pressure and temperature of said fluid greater than said first given pressure and temperature,
   fluid flow varying means acting upon said cam means independently of said piston for automatically changing the flow rate of said fluid to a third predetermined flow rate greater than said second predetermined flow rate in response to an increase from at least one of said first to said second given pressures and temperatures of said fluid.

2. The fluid pressure device of claim 1 wherein said fluid flow varying means is associated with said cam means so as to change said cam surface to alter the cyclic variation of the volume of said cylinder in response to said increase from at least one of said first to said second given temperatures and pressures.

3. The fluid pressure device of claim 2 wherein said cam means is movable and said fluid flow varying means comprise resilient means which exert a force on said cam means.

4. The fluid pressure device of claim 1 wherein said fluid flow varying means comprise a plurality of resilient concave discs positioned in mechanical bearing relationship with said cam means, the degree of concavity of said discs varying in response to said increase from said first to said second given pressures to change said force with which said discs bear against said cam means.

5. The fluid pressure device of claim 4 wherein at least some of said discs are bimetallic, the degree of concavity of said bimetallic discs varying in response to an increase from said first to said second given temperatures to change said cam surface.

6. The fluid pressure device of claim 1 wherein said fluid flow varying means also includes compensating means for changing the flow rate of said fluid to a fourth predetermined flow rate differing from said second and third predetermined flow rates.

7. The fluid pressure device of claim 6 wherein said cam means is movable about a pivot axis and a plurality of said pistons are pivotally associated with said cam means, the pivot axis of each of said pistons lying in a plane, and wherein said compensating means comprises said plane being spaced from said pivot axis of said cam means.

8. The fluid pressure device of claim 1 wherein said fluid flow varying means comprises:
   piston means contacting said cam means in spaced relationship to a pivot axis of said cam means,
   conduit means communicating said discharge means with said piston means, and
   resilient means contacting said cam means in spaced relationship to said pivot axis opposite said piston means, said resilient means changing resiliency in response to changes in temperature and pressure of said fluid.

9. A fluid pressure device of the type including a rotor mounted for rotation and defining a plurality of cylinders therein extending in parallel relationship to each other and to the rotational axis of said rotor, a plurality of pistons extending from one end of said rotor into said cylinders, a valve plate communicating with the other end of said rotor and having inlet and discharge ports cyclically communicating with the cylinders when said rotor is rotated to introduce to and remove fluid from said cylinders, and a cam plate pivotally mounted for rotation about a pivot axis adjacent said one end of said rotor and having a cam surface mechanically associated with said pistons such that said pistons reciprocate in said cylinders when said rotor is rotated to vary the volume of said cylinders, wherein the improvement comprises in combination therewith:
   fluid flow rate varying means bearing against said cam plate at a point spaced from the pivot axis of said cam plate, said flow rate varying means including resilient means responsive to an increase in at least one of the pressure or temperature of the fluid to rotate said cam plate about its pivot axis to increase the flow rate of said fluid.

10. The fluid pressure device of claim 9 wherein said fluid flow rate varying means includes piston means which tends to rotate said cam plate in a first direction about its pivot axis, said resilient means tending to rotate said cam plate in a direction opposite said first direction.

11. The fluid pressure device of claim 9 wherein said resilent means comprise a plurality of concave discs.

12. The fluid pressure device of claim 11 wherein said discs are bimetallic.

13. The fluid pressure device of claim 9 wherein said pistons are pivotally associated with said cam plate, the pivot axis of each of said pistons lying in a plane which is spaced from said pivot axis of said cam plate.

14. A fluid pressure device having inlet and discharge means for introducing fluid to said device and discharging fluid from said device, a plurality of pistons reciprocal in said device, tiltable cam means coacting with said pistons to vary the stroke thereof, and compensating means responsive to an increase in at least one of temperature and pressure of the fluid in said device for increasing the flow rate of the fluid flowing through said device to a predetermined flow rate which is greater than the flow rate through said device associated with said one of said increased temperature and pressure, wherein the improvement in said compensating means comprises:

a plurality of resilient concave discs positioned in communication with said fluid, the degree of concavity of said discs varying in response to said increase in said one of said temperature and pressure of said fluid to exert a variable force on said cam means to tilt said cam means so as to increase the flow rate of the fluid flowing through said device to said predetermined greater flow rate.

15. The fluid pressure device of claim 14 wherein said discs are bimetallic.

16. The fluid pressure device of claim 14 wherein said compensating means is responsive to an increase in both temperature and pressure.

References Cited

UNITED STATES PATENTS

| | | | |
|---|---|---|---|
| 2,585,232 | 2/1952 | Douglas | 91—475 |
| 3,180,266 | 4/1965 | Smith | 417—282 |
| 3,313,531 | 4/1967 | Winkley | 417—292 |
| 2,129,828 | 9/1938 | Dunn | 91—475 |
| 2,915,985 | 12/1959 | Budzich | 91—475 |
| 2,716,946 | 9/1955 | Hardy | 417—282 |
| 3,175,510 | 3/1965 | D'Amato | 91—505 |
| 2,547,154 | 4/1951 | Douglas | 417—212 |
| 2,459,303 | 1/1949 | Baker | 417—292 |
| 2,592,281 | 4/1952 | High | 417—292 |
| 2,768,585 | 10/1956 | Hardy | 417—213 |
| 3,053,196 | 9/1962 | Henrichsen | 417—219 |
| 1,908,534 | 5/1933 | Parsons | 60—53 A |

WILLIAM L. FREEH, Primary Examiner

U.S. Cl. X.R.

91—506